US008720860B2

(12) United States Patent
Noah et al.

(10) Patent No.: US 8,720,860 B2
(45) Date of Patent: May 13, 2014

(54) HAMMER WITH LEVERAGE NO. II

(71) Applicant: Penn United Technologies, Inc., Cabot, PA (US)

(72) Inventors: Mark P. Noah, Butler, PA (US); Glenn R. Snyder, Dayton, PA (US); Charles M. Phillips, Sr., Zelienople, PA (US)

(73) Assignee: Penn United Technologies, Inc., Cabot, PA (US)

( * ) Notice: Subject to any disclaimer, the term of this patent is extended or adjusted under 35 U.S.C. 154(b) by 0 days.

(21) Appl. No.: 14/010,676

(22) Filed: Aug. 27, 2013

(65) Prior Publication Data

US 2013/0341577 A1 Dec. 26, 2013

Related U.S. Application Data

(63) Continuation of application No. 13/587,956, filed on Aug. 17, 2012, now Pat. No. 8,544,821, which is a continuation of application No. 12/538,195, filed on Aug. 10, 2009, now Pat. No. 8,292,266, which is a continuation of application No. 11/894,895, filed on Aug. 22, 2007, now Pat. No. 7,631,853.

(51) Int. Cl.

| | |
|---|---|
| ***B25C 11/00*** | (2006.01) |
| ***B66F 15/00*** | (2006.01) |
| ***B21D 39/03*** | (2006.01) |
| ***B23P 11/00*** | (2006.01) |
| ***B25D 1/00*** | (2006.01) |
| *B23Q 3/00* | (2006.01) |

(52) U.S. Cl.

USPC ............ 254/26 E; 254/26 R; 254/21; 29/428; 81/20

(58) Field of Classification Search

USPC ............................................................ 254/26

See application file for complete search history.

(56) References Cited

U.S. PATENT DOCUMENTS

| | | | |
|---|---|---|---|
| 540,967 | A | 6/1895 | Eveleth |
| 619,325 | A | 2/1899 | Martin |
| 856,097 | A | 6/1907 | Palmer |
| 939,933 | A | 11/1909 | Trautner |
| 1,125,999 | A | 1/1915 | Frey |
| 1,822,280 | A | 9/1931 | Ervay |
| 2,589,046 | A | 3/1952 | Brown et al. |
| 2,589,047 | A | 3/1952 | Brown et al. |
| 2,741,456 | A | 4/1956 | Williams |
| 4,422,620 | A | 12/1983 | Nitzberg |

(Continued)

*Primary Examiner* — Lee D Wilson
*Assistant Examiner* — Alvin Grant
(74) *Attorney, Agent, or Firm* — Eckert Seamans Cherin & Mellott, LLC; David C. Jenkins

(57) ABSTRACT

A hand tool includes an elongated plunger assembly and a locking assembly. The locking assembly has a catch assembly with a release actuator. The release actuator is movable in a direction generally not aligned with the tool head plane of motion. The locking assembly catch member is structured to engage the plunger assembly body and maintain the plunger assembly body in a selected position. Further, the plunger assembly is disposed in a socket within the tool head and biased toward an extended position by a spring. The release actuator is, preferably, disposed on the neck of the hand tool just above the user's thumb. When the plunger assembly body is disposed within the tool head and a user desires to extend the plunger assembly, the user actuates the release actuator thereby removing the engagement of the catch member and allowing the socket spring to move the plunger assembly body to the extended position.

5 Claims, 7 Drawing Sheets

(56) References Cited

U.S. PATENT DOCUMENTS

| | | | |
|---|---|---|---|
| 4,635,327 A | 1/1987 | Netznik | |
| D289,729 S | 5/1987 | Porter | |
| 4,998,996 A | 3/1991 | Belanger | |
| 5,058,862 A | 10/1991 | Schlegel | |
| 5,249,776 A | 10/1993 | Johnson | |
| 5,280,738 A | 1/1994 | Liou | |
| 5,441,236 A | 8/1995 | Kiernan | |
| 5,531,140 A | 7/1996 | Chow | |
| 5,594,974 A | 1/1997 | Wattron et al. | |
| 6,279,876 B1 | 8/2001 | Massie | |
| 6,311,582 B1 | 11/2001 | Chow | |
| 6,363,817 B1 | 4/2002 | Lamond et al. | |
| 6,827,333 B1 * | 12/2004 | Lutz | 254/26 E |
| 7,051,998 B2 | 5/2006 | Sleiman | |
| 7,299,717 B2 | 11/2007 | Chen | |
| 7,438,279 B2 | 10/2008 | Eby et al. | |
| 7,631,853 B2 | 12/2009 | Noah et al. | |
| 7,810,216 B2 | 10/2010 | Zubiaurre et al. | |
| 7,896,314 B2 * | 3/2011 | Noah et al. | 254/26 E |
| 7,979,971 B2 * | 7/2011 | Noah et al. | 29/428 |
| 8,177,192 B1 | 5/2012 | Taylor et al. | |
| 2005/0017225 A1 | 1/2005 | Sleiman | |
| 2007/0114501 A1 | 5/2007 | Eby et al. | |
| 2008/0277636 A1 | 11/2008 | Noah et al. | |
| 2010/0186213 A1 | 7/2010 | Noah et al. | |

* cited by examiner

HAMMER WITH LEVERAGE NO. II

CROSS-REFERENCE TO RELATED APPLICATIONS

This application is a continuation of U.S. patent application Ser. No. 13/587,956, entitled "Hammer with Leverage No. II, which was filed on Aug. 17, 2012, which application is a continuation of U.S. application Ser. No. 12/538,195, entitled "Hammer with Leverage No. II," which was filed on Aug. 10, 2009, which is a continuation of U.S. application Ser. No. 11/894,895 entitled "Hammer with Leverage No. II," which was filed on Aug. 22, 2007.

BACKGROUND OF THE INVENTION

1. Field of the Invention

This invention relates to a hand tool having a claw and, more specifically, a hand tool having an extendable plunger disposed adjacent to the claw.

2. Background Information

Hand tools having claws include, but are not limited to, hammers, crowbars, and wrecking bars. Of these, hammers are the most common and well known and, hereinafter, it is understood that as used herein a "hammer" shall mean any hand tool having a claw. The claw, typically includes two fingers with a narrowing gap therebetween. The claw is disposed at one end of the hand tool, such as at the head of a hammer, and extends generally perpendicular to the longitudinal axis of the hand tool handle. The claw is, typically, slightly arcuate. The claw is used to pry nails and other elements away from a substrate. For example, a nail having a shaft and a head is disposed in a board. If the nail is not already loose, a user initially pries the nail out of the board using the distal tips of the claw. Once the nail head is spaced from the board, a user positions the nail shaft in the gap between the claw fingers and positions the head of the hammer against the board. The user then pivots the hammer in a plane extending through the axis of the gap in the claw and in a direction away from the claw. That is, the user pushes, or pulls, depending upon his position relative to the hammer, on the hammer handle in a direction away from the claw. As the head of the hammer pivots against the board, the claw engages the nail head. The claw and the nail then move away from the substrate while traveling through an arc. If a nail is generally short, for example, about an inch or two in length, such a motion will completely remove the nail from the board or remove enough of the nail so that the user may simply pull the nail free. That is, when the nail is inserted into the board, the nail creates a generally straight hole and is held in place by friction. When a nail is relatively short, the arcuate motion of the claw pulls the nail generally longitudinally until the friction with the board is reduced and the nail is pulled free.

There are, however, longer nails. Nails with an extended length may still be substantially disposed within the substrate and held by friction after the hammer has been pivoted. Also, where a long nail is made from a very rigid material, the nail may not bend as it is being pulled from the generally straight nail hole. In this instance, the head of the nail may be lifted above the claw causing the claw to simply slide over the shaft of the nail. From a mechanical perspective, the problem with this situation is that the pivot point of the hammer, as well as the path of travel of the claw, is below the head of the nail. Thus, one very old solution was to place a board, or other object, below the head of the hammer thereby placing the pivot point and the head of the nail in about the same plane. In this configuration, the pivoting motion of the hammer again caused the claw to engage and lift the nail head.

Rather than having a user find or carry an extra board, prior improvements incorporated a plunger into the tool head. That is, as shown in U.S. Pat. No. 540,967, a spring loaded plunger was disposed in the head of a hammer The plunger was structured to extend along the axis of the hammer handle and was held in place by a release lever. The release lever included a lateral latch that engaged notches on the plunger. When the user actuated the release lever, the latch would disengage the notch and the spring would cause the plunger to extend from the top of the hammer head. The plunger positioned the hammer head a distance from the substrate, or board, and generally in the same plane as the head of the nail. The user could then pivot the hammer about the tip of the plunger. Disadvantages of this configuration included the cost and complexity of the release lever. Further, the release lever could accidentally release when the hammer was used to impact another object. That is, the release lever operated in a plane corresponding to the plane of the hammer head. Thus, when the hammer head impacted an object, e.g. a nail, the release lever could accidentally be actuated causing the plunger to extend.

SUMMARY OF THE INVENTION

The concept disclosed and claimed below provides for a hand tool having an elongated plunger and a locking assembly having a catch assembly with a release actuator, the release actuator movable in a direction generally not aligned with the tool head plane of motion. The locking assembly catch member is structured to engage the plunger assembly body and maintain the plunger assembly body in a selected position. Further, the plunger is disposed in a socket within the tool head and biased toward an extended position by a spring. The release actuator is, preferably, disposed on the neck of the hand tool just above the user's thumb. When the plunger body is disposed within the tool head and a user desires to extend the plunger, the user actuates the release actuator thereby removing the engagement of the catch member and allowing the socket spring to move the plunger body to the extended position.

In one embodiment, the locking assembly includes a movable pin disposed in a blind bore. The catch member is a ball that is structured to engage one or more detents disposed on the plunger assembly body. The ball is actuated by a pin having a wedge shaped cutout thereon. That is, the release actuator is a pin having a wide portion and a narrow portion with a, preferably, smooth transition therebetween. The pin is disposed in a bore that extends generally perpendicular to the plunger socket. A small passage, which may simply be an opening, exists between the socket and the bore. The ball is disposed at, and extends through the passage. The ball is, essentially, trapped in this location by the structure of the passage but may move either toward or away from the plunger socket. The pin is structured to move longitudinally in the bore. The pin moves between a first position, wherein the ball is disposed on the pin wide portion, and a second position, wherein the ball is disposed on the pin narrow portion. When the ball is disposed on the pin wide portion, the ball is biased toward, and engages, the plunger thereby maintaining the plunger in place. When the ball is disposed on the pin narrow portion, the ball is not biased against the plunger and does not effectively engage the plunger. That is, the plunger is free to move between its first and second positions. The pin is trapped in the bore and biased toward the first position by a spring. To overcome the bias of the spring and move the pin to its second position, a user merely presses on the exposed end of the pin. It is noted that the pin extends in a direction generally perpendicular to the plane of motion through which the tool head typically travels. As such, the pin is resistant to moving between the first and second positions when the tool head impacts another object.

In another embodiment, the release actuator is rotatable and includes a cam thereon. That is, as with the embodiment identified above, the locking assembly includes a bore disposed adjacent to the plunger socket having a passage therebetween. The release actuator is an elongated member that is rotatably disposed in the bore. The release actuator has, on a medial portion, a cam. The cam has a wide diameter section, a transition section, and a narrow diameter section. The release actuator rotates between a first position, wherein the cam wide diameter section extends through the passage and frictionally engages the plunger body, and a second position, wherein the cam narrow diameter section is disposed at the passage and the cam does not effectively engage the plunger body. The release actuator preferably includes a flat grip that extends from the bore and a threaded distal end. The bore preferably includes a reduced diameter threaded portion at the bottom of the bore, and a larger diameter portion at the passage. The axis of the threaded portion of the bore is offset from the axis of the larger diameter portion. The distal end of the release actuator preferably engages the threaded portion of the bore with some friction so as to prevent the release actuator from freely rotating. Further, a support collar may be disposed about the release actuator in the larger diameter portion of the bore.

In another embodiment, the release actuator is a pin having a disk, or lobe, disposed thereon. The pin is disposed in a lateral bore that partially intersects with the socket. The disk has a radius that corresponds to the radius of the bore. As such, when the disk is disposed within the portion of the bore that intersects the socket, the disk extends into the socket. The plunger includes at least one lateral groove. The groove corresponds to the shape of the portion of the bore that extends into the socket. That is, when the groove is aligned with the bore, the groove emulates that portion of the bore sidewall that is missing due to the presence of the socket. In this configuration, the actuator may be moved between a first position, wherein the disk is disposed in the portion of the bore that intersects with the socket, and a second position, wherein the disk has moved laterally into the bore only. When the pin is in the first position, the disk is partially disposed in the socket and extends into the groove. When the disk is in the groove, the plunger is restrained from moving within the socket. When the pin is in the second position, the disk is not disposed within the groove and the plunger may move within the socket. Preferably there are at least two grooves, a first groove positioned to align with the bore when the plunger is in a first withdrawn position and a second groove positioned to align with the bore when the plunger is in a second, extended position.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As used herein, the word "unitary" means a component is created as a single piece or unit. That is, a component that includes pieces that are created separately and then joined together as a unit is not a "unitary" component or body.

As used herein, "coupled" means a link between two or more elements, whether direct or indirect, so long as a link occurs. Further, different portions of a unitary body are also "coupled" together.

As used herein, "directly coupled" means that two elements are directly in contact with each other.

As used herein, "fixedly coupled" means that two separate elements are coupled so as to move as one.

As used herein, "effectively engage" when used in relation to a catch member means that the catch member engages another element with sufficient force to maintain the element in a position under normal operating conditions. For example, a hammer would be expected to experience impact loads on the face of the hammer head but would not, typically, be expected to experience impact loads on the top of the hammer head.

Figure 1:
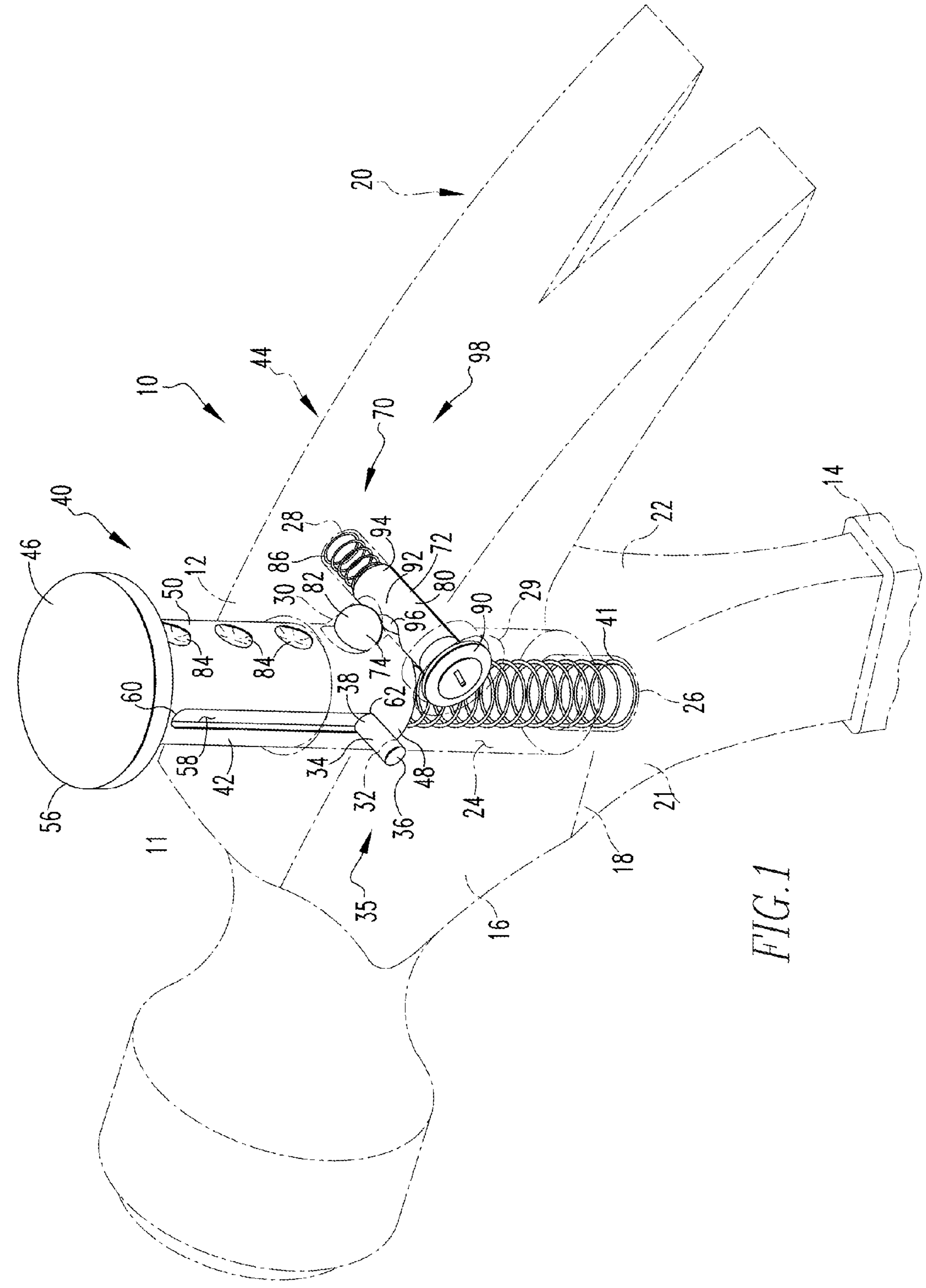
FIG. 1 is an isometric cutaway view of the tool with the plunger in the extended position.
Figure 2:
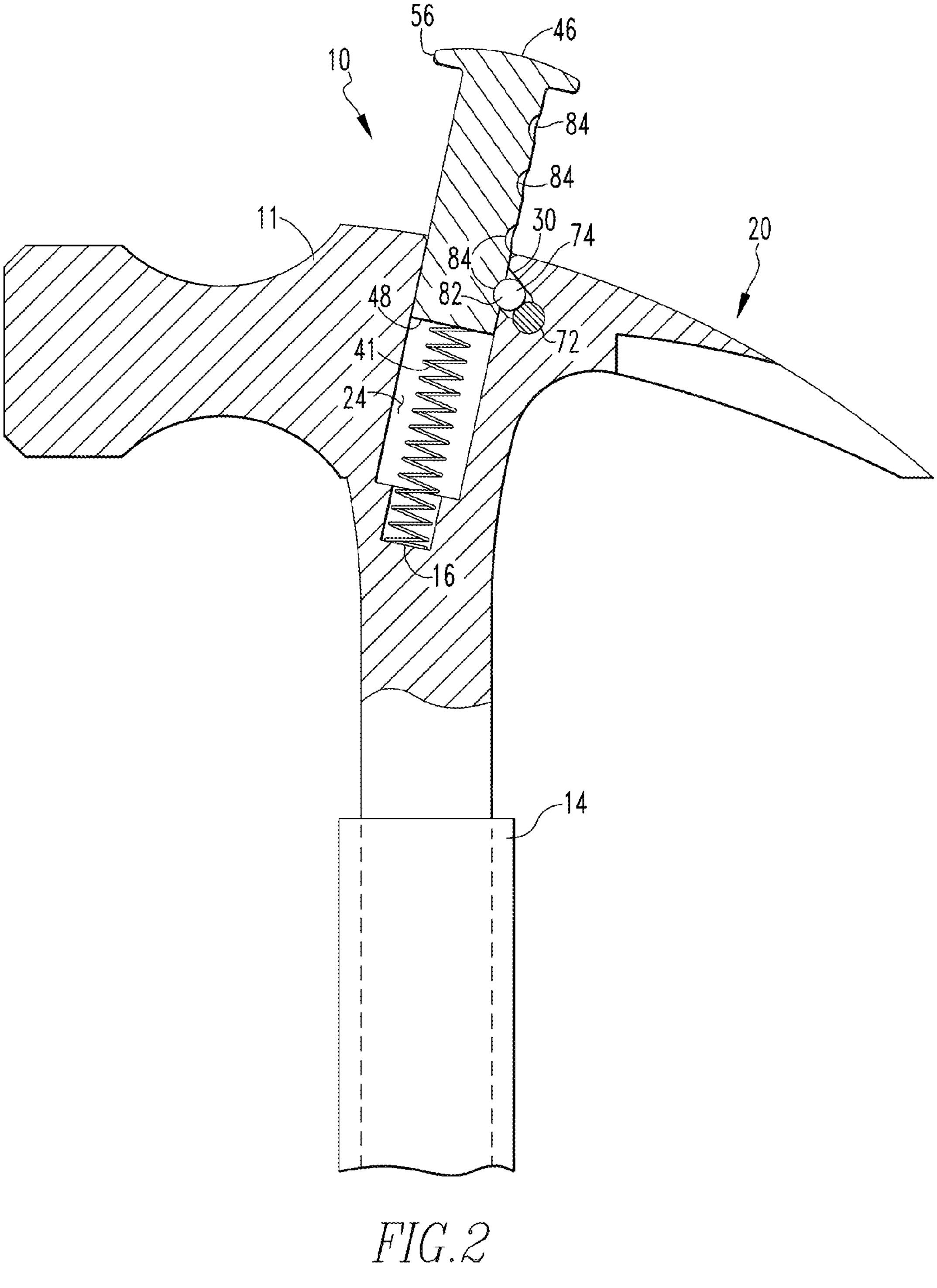
FIG. 2 is a cross-sectional side view of the tool with the plunger in the extended position.
Figure 3:
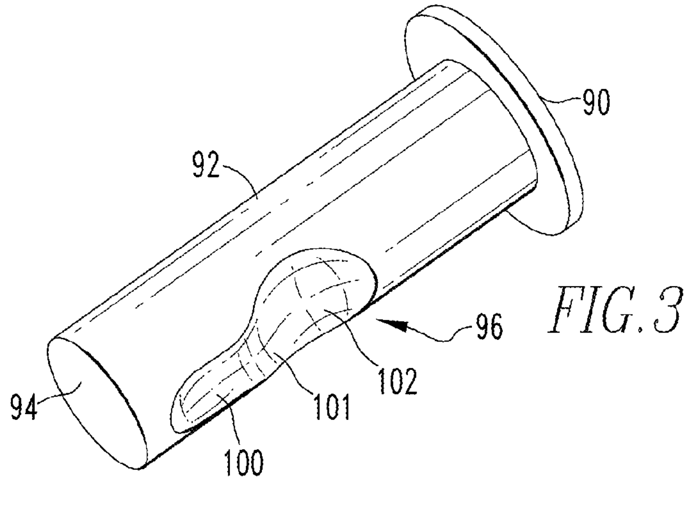
FIG. 3 is a detailed isometric view of the pin.
Figure 4:
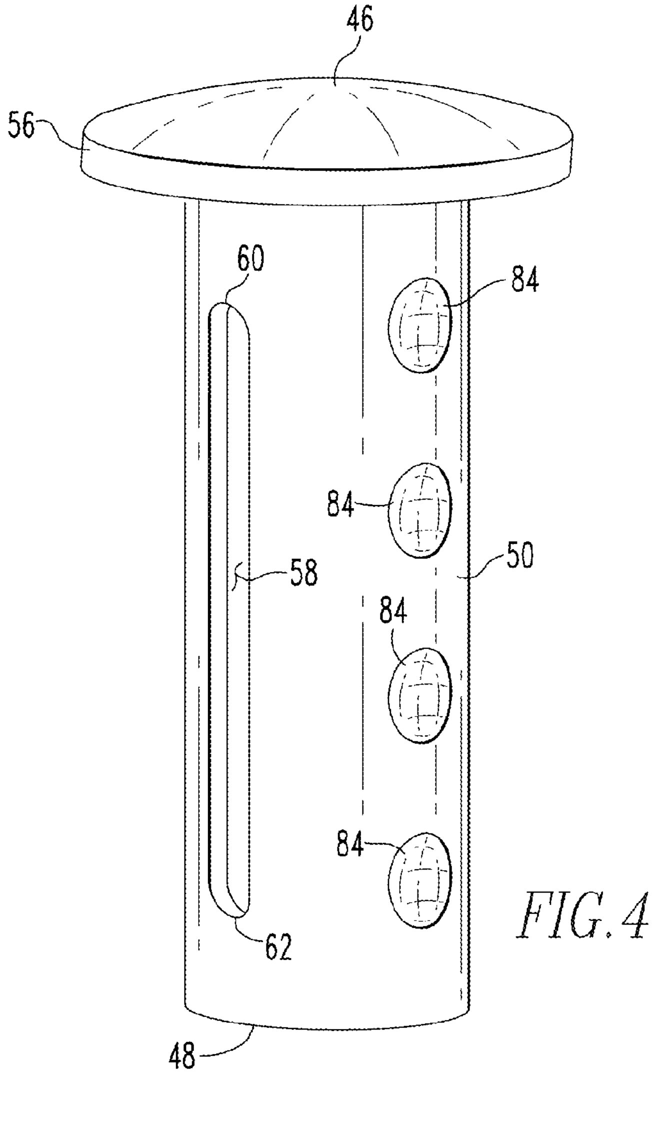
FIG. 4 is a detailed isometric view of one embodiment of the tool.

As shown in FIGS. 1-3, a hand tool 10, which is shown as a hammer 11, includes a tool head 12 which is coupled to a handle 14. The tool head 12 is preferably a unitary body 16 having an axial portion 18, which typically extends along the axis of the handle 14, a claw 20, which typically extends perpendicular the axis of the handle 14, and a neck 22, which also typically extends along the axis of the handle 14. As is well known in the art, the hand tool 10 may be used to strike another object. Typically, the tool head 12 travels through a plane of motion generally defined by the plane extending through the longitudinal axis of the handle 14 and a centerline of the claw 20.

The tool head 12 defines an elongated socket 24 having a bottom 26. Preferably, the socket 24 is disposed in the axial portion 18. The tool head 12 also defines a lateral bore 28 extending from an opening 29 on the outer surface of the tool head 12 laterally adjacent to the socket 24. That is, the lateral bore 28 extends generally perpendicular to the longitudinal axis of the socket 24. There is also a passage 30 extending between the socket 24 and the lateral bore 28. The passage 30 may be a simple opening where the socket 24 and the lateral bore 28 intersect. The tool head 12 may also define a travel limiter bore 32 which is a bore extending generally radially from the socket 24 to one side of the tool head 12. A travel limiter 34, which is preferably a rod 36 having a length slightly longer than travel limiter bore 32, is disposed within the travel limiter bore 32. When the travel limiter 34 is installed in the travel limiter bore 32, the travel limiter 34 is, preferably, flush with outer surface of the tool head 12 so that a portion of the travel limiter 34 extends into the socket 24. That is, the travel limiter 34 is a protrusion 38 within the socket 24.

The hand tool 10 further includes a plunger assembly 40 having a spring 41, an elongated body 42 and a locking assembly 44. The plunger assembly body 42 has a top end 46, a bottom end 48, and a medial portion 50. The plunger assembly body top end 46 may also include a cap 55 which is a disk 56 disposed in a plane generally perpendicular to the longitudinal axis of the plunger assembly body 42. The disk 56 is larger than the socket 24 and provides a pivot surface. The plunger assembly body 42 may include a longitudinally extending, travel limiter groove 58. The travel limiter groove 58 has a closed top end 60 and a closed bottom end 62. That is, the travel limiter groove 58 does not extend to, and open over, the edge of the plunger assembly body 42. The plunger assembly spring 41 is, preferably, a compression spring.

The plunger assembly body 42 is disposed within the socket 24 with the plunger assembly spring 41 disposed between the socket bottom 26 and the plunger assembly body bottom end 48. The plunger assembly body 42 is structured to move between a first, withdrawn position, wherein the plunger assembly body 42 is substantially disposed within the socket 24, and a second, extended position, wherein the plunger assembly body 42 extends from the socket 24. The plunger assembly spring 41, preferably, biases the plunger assembly body 42 toward the second, extended position. The path of travel of the plunger assembly body 42 is, preferably, limited by the travel limiter groove 58. That is, when the plunger assembly body 42 is initially disposed within the socket 24, the travel limiter 34 is not yet installed in the travel limiter bore 32. Once the plunger assembly body 42 is within the socket 24, the plunger assembly body 42 is rotated until the travel limiter groove 58 is aligned with the travel limiter bore 32. The travel limiter 34 is then installed within the travel limiter bore 32. As set forth above, the travel limiter 34 extends into the socket 24 and, with the plunger assembly body 42 in place, into the travel limiter groove 58. Thus, the plunger assembly body 42 may move out of the socket 24 until the travel limiter 34 engages the groove bottom end 62. Further, the travel limiter 34 acts as an anti-rotation structure 35 in that, upon rotation, the travel limiter 34 engages the sides of the travel limiter groove 58, and prevents the plunger assembly body 42 from rotating in the socket 24.

In an alternate embodiment, the plunger assembly spring 41 may be fixedly coupled to both the socket bottom 26 and the plunger assembly body bottom end 48. In this configuration, the plunger assembly spring 41 traps the plunger assembly body 42 within the socket 24 and resists rotation thereof The anti-rotation structure 35 may also be embodied by a socket 24 and a plunger assembly body 42 having corresponding, non-circular cross-sectional shapes, preferably oval cross-sectional shapes. The plunger assembly body 42 has a cross-sectional area that is slightly smaller than the non-circular shaped socket 24. In this configuration, the plunger assembly body 42 is not free to rotate within the socket 24.

The locking assembly 44 is structured to maintain said plunger assembly body 42 in a selected position. The locking assembly 44 includes the lateral bore 28, described above, a catch assembly 70 having a release actuator 72 which acts upon a catch member 74. The release actuator 72 is structured to move within the lateral bore 28 between a first position, wherein the catch member 74 is biased to engage the plunger assembly body 42, and a second position, wherein the catch member 74 is not biased to engage the plunger assembly body 42. That is, "biased to engage" means that the catch member 74 may be biased against the plunger assembly body 42 or biased into a position wherein the catch member 74 extends into the path of travel of the plunger assembly body 42. In either configuration, the catch member 74 is structured to maintain the plunger assembly body 42 in a selected position. When the catch member 74 is biased to engage the plunger assembly body 42, the plunger assembly body 42 is effectively engaged and not generally free to move between the first and second positions. The release actuator 72 is structured to not be actuated by forces created by an impact load applied in the tool head 12 plane of motion.

For example, in one embodiment, the release actuator 72 is movable in a direction generally perpendicular to the tool head 12 plane of motion. In this embodiment, the locking assembly 44 includes the lateral bore 28, described above, a pin 80, which is the release actuator 72, a ball 82, which is the catch member 74, at least one, and preferably a plurality of, detents 84 and a catch assembly spring 86. The detents 84, where there is more than one, are disposed in a longitudinal line on the plunger assembly body 42. The detents 84 are positioned to align with the passage 30. The pin 80 has a first end 90, a medial portion 92, and a second end 94. The pin first end 90 is structured to extend from the lateral bore 28 and is further structured to act as a button. The pin medial portion 92 has a cutout 96 shaped to act as a wedge 98. The wedge 98 has a wide section 100 and a narrow section 102, with a generally smooth transition section 101 therebetween. Preferably, the cutout 96 is shaped to generally conform to the shape of the catch member 74. For example, where the catch member 74 is a ball 82, the wedge wide section 100 may be shaped generally as a semi-spherical cavity. The pin second end 94 may be structured to be fixedly coupled to the catch assembly spring 86. The catch assembly spring 86 is, preferably, a compression spring.

When assembled, the catch assembly spring 86 and the pin 80 are disposed in the lateral bore 28 with the catch assembly spring 86 being disposed between the pin second end 94 and the bottom of the lateral bore 28. The pin 80 is maintained in the lateral bore 28 by a trap device 110 which may be similar to the travel limiter 34 described above, a collar (not shown) or, in the preferred embodiment, includes the catch assembly spring 86 being fixedly coupled to both the pin second end 94 and the bottom of the lateral bore 28. The pin 80 is positioned so that, when the catch assembly spring 86 is not compressed, the wedge narrow section 102 is disposed adjacent to the passage 30 and the pin first end 90 extends out of the lateral bore 28. Further, the ball 82 is disposed at, or partially within, the passage 30. That is, one side of the ball 82 extends into the socket 24 and the opposing side extends into the lateral bore 28. In this configuration, the release actuator 72, that is, the pin 80, is structured to move within the lateral bore 28 between a first position, wherein the catch member 74, i.e. the ball 82, is biased against the plunger assembly body 42, and a second position, wherein the catch member 74 is not biased against the plunger assembly body 42. When the release actuator 72 is in the second position, the catch member 74 may contact the plunger assembly body 42, but the catch member 74 does not effectively engage the plunger assembly body 42. A user may move the release actuator 72 to the second position by pressing on the pin first end 90 with sufficient force to overcome the bias of the catch assembly spring 86.

In this configuration, the release actuator 72 is typically in the first position wherein the release actuator 72 biases the catch member 74, i.e. the ball 82, against the plunger assembly body 42 and, more specifically, the ball 82 engages one of the at least one detents 84. When the user presses on the pin first end 90 with sufficient force to overcome the bias of the catch assembly spring 86, the release actuator 72 moves laterally until the ball 82 is positioned in the wedge wide section 100. At this point, the catch member 74 does not effectively engage the plunger assembly body 42 and the plunger assembly body 42, under the influence of the plunger assembly spring 41, moves toward its second position. The user may apply a counter force to the plunger assembly body 42 and limit the motion so that the plunger assembly body 42 stops in an intermediate position or may apply a sufficient force to overcome the bias of the plunger assembly spring 41 and move the plunger assembly body 42 into the first position. Once the plunger assembly body 42 is in the desired position, the user releases the pressure on the pin first end 90 thereby allowing the catch assembly spring 86 to return the release actuator 72 to the first position. When the release actuator 72 is in the first position, the catch member 74 is again biased against the plunger assembly body 42.

Figure 5:
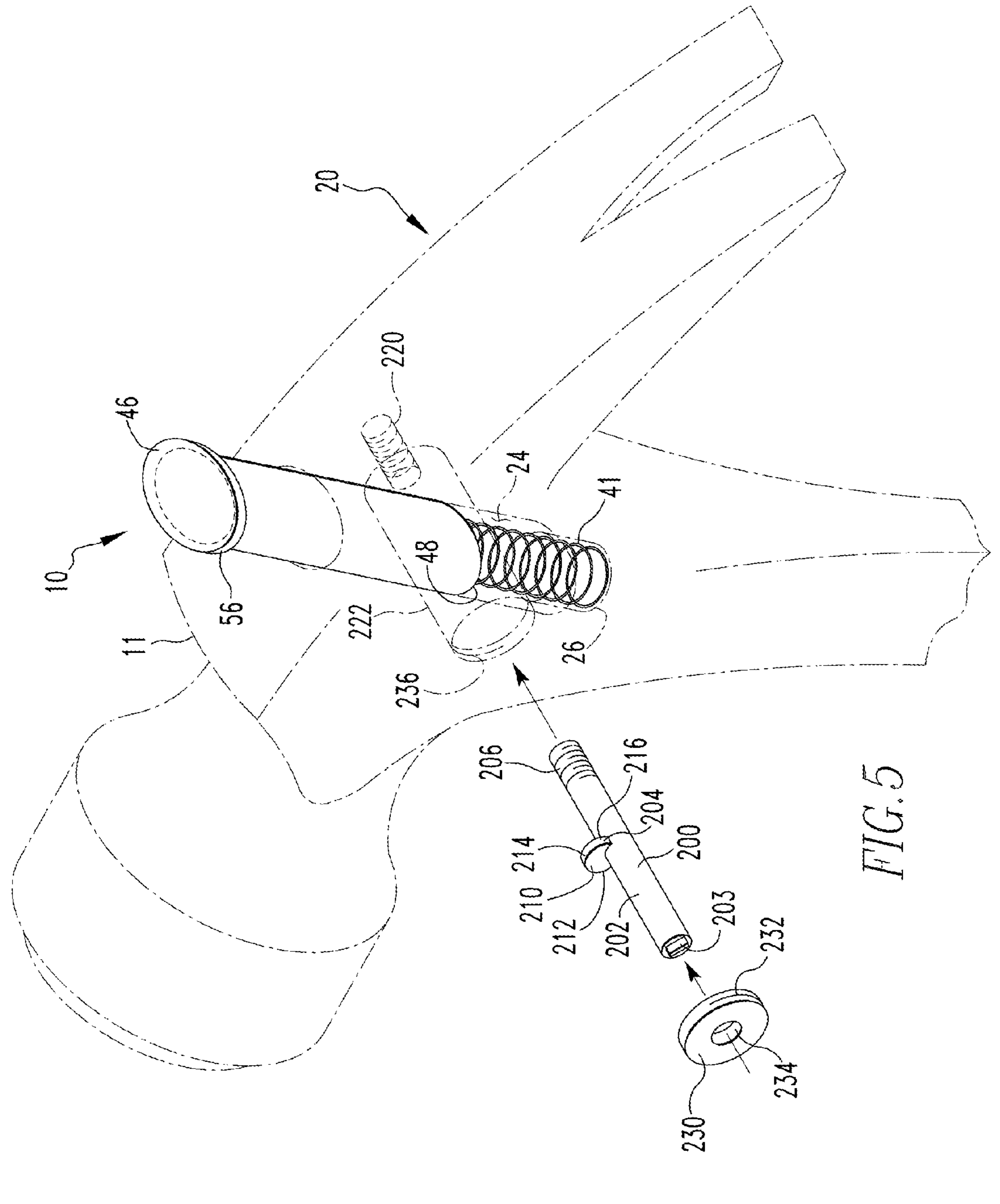
FIG. 5 is a detailed exploded view of another embodiment of the tool.
Figure 6:
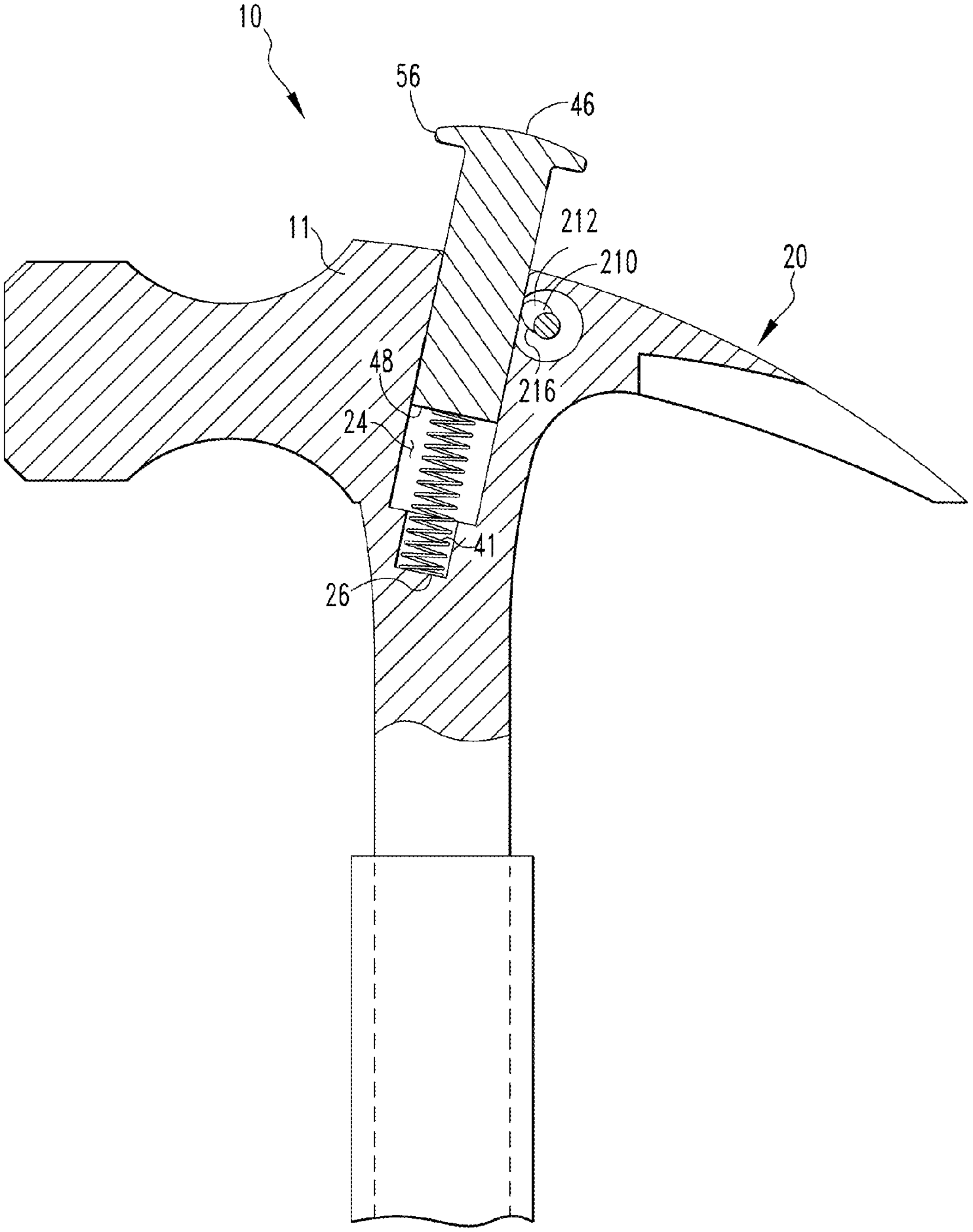
FIG. 6 is a cross-sectional side view of the other embodiment of the tool with the release actuator in a first position.
Figure 7:
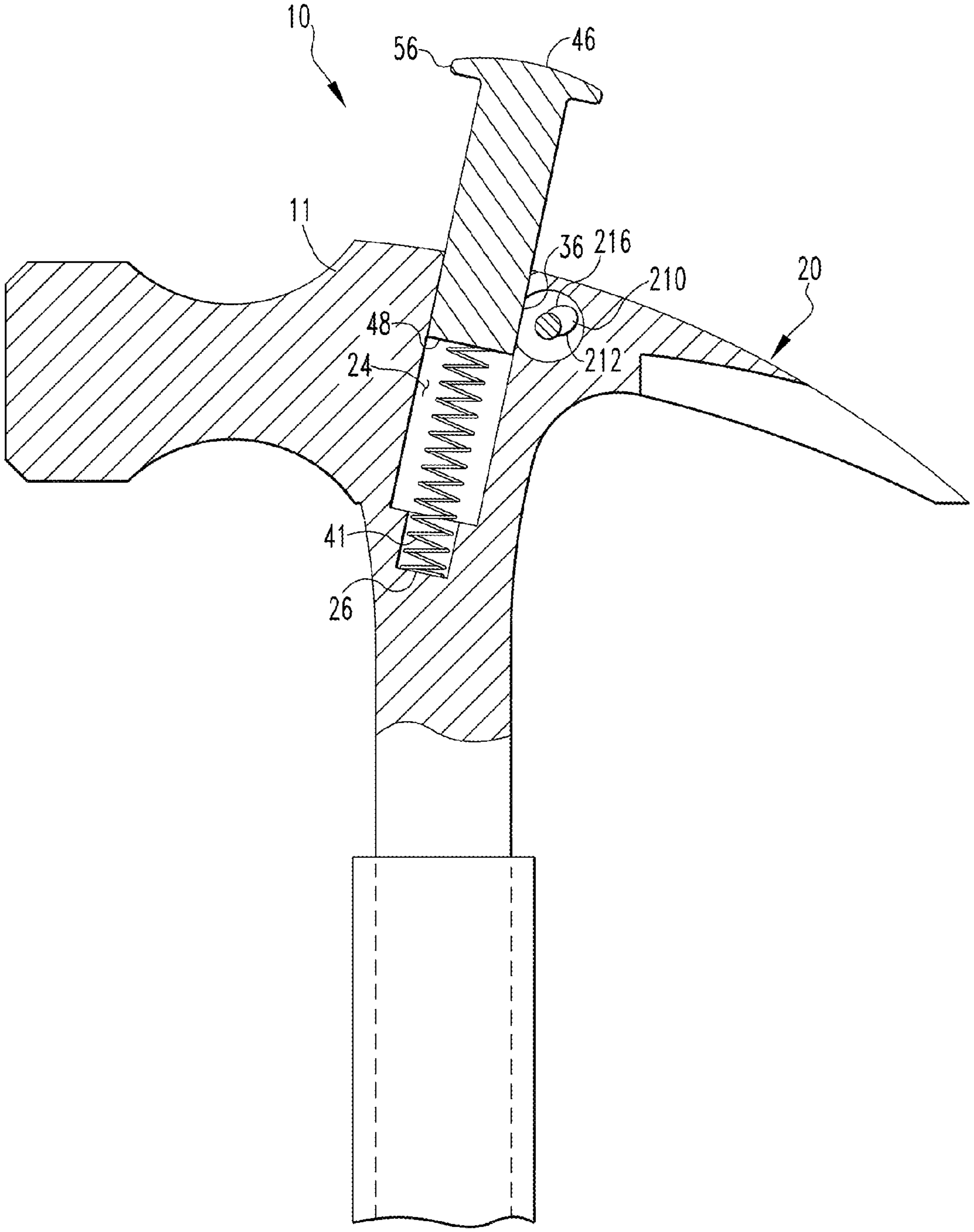
FIG. 7 is a cross-sectional side view of the embodiment of the tool shown in FIG. 5 with the release actuator in a second position.

In another embodiment, shown in FIGS. 5-7, the release actuator 72 is a rotatable body 200 having a cam 210. It is understood that, unless otherwise noted, the tool head 12, handle, plunger assembly 40 and anti-rotation structure 35 may be the same as in the embodiment described above. The body 200 extends in, and is rotatable about, an axis extending in a direction generally perpendicular to the tool head 12 plane of motion. The elongated body 200 has a first end 202, a medial portion 204, and a second end 206. Further, in this embodiment, the catch member 74 is a cam 210 disposed on the release actuator body medial portion 204. The cam 210 has a wide diameter section 212, a transition section 214, and a narrow diameter section 216. The release actuator body 200 is rotatably disposed in the lateral bore 28 and structured to move between a first orientation, wherein the cam wide diameter section 212 extends through the passage 30 and engages the plunger assembly body 42, and a second orientation, wherein the cam narrow diameter section 216 is aligned with the passage 30 and the release actuator cam 210 does not effectively engage the plunger assembly body 42. The release actuator body first end 202 preferably includes an extension 203 structured to be engaged by a finger of a user, such as, but not limited to, a flat, plate-like extension.

Preferably, the lateral bore 28 includes a reduced diameter portion 220 and a wide diameter portion 222. The lateral bore reduced diameter portion 220 is disposed on the blind, that is, closed, side of the lateral bore 28 while the lateral bore wide diameter portion 222 extends from a medial location within the lateral bore 28, and includes the passage 30, to the opening 29 on the tool head 12. The release actuator body second end 206 is structured to fit snugly within the lateral bore reduced diameter portion 220 so that friction resists the free rotation of the release actuator 72. Further, the lateral bore reduced diameter portion 220 and the release actuator body second end 206 may have corresponding threads.

In this embodiment, the locking assembly 44 may further include a torus-shaped collar 230. The collar 230 has a threaded outer surface 232 and a generally smooth inner surface 234. Further, the lateral bore 28 includes a threaded portion 236 adjacent to the opening 29. The collar threaded outer surface 232 is sized to engage the lateral bore threaded portion 236. The release actuator body first end 202 has a diameter which is, preferably, smaller than the diameter of the cam wide diameter section 212. The collar inner surface 234 is sized to correspond to the release actuator body first end 202 diameter. That is, preferably, the collar inner surface 234 snugly engages the release actuator body first end 202 so as to resist rotation.

This embodiment of the locking assembly 44 is assembled as follows. The release actuator body 200 is rotatably disposed in the lateral bore 28 with the release actuator body second end 206 disposed in the lateral bore reduced diameter portion 220. The cam wide diameter section 212 has a maximum diameter that is just smaller than the diameter of the lateral bore wide diameter portion 222 and, as such, may be inserted into the lateral bore wide diameter portion 222. The cam 210 is positioned on the release actuator body 200 so that, when the release actuator body 200 is inserted into the lateral bore 28, the cam 210 is aligned with the passage 30. The collar 230 may then be installed by passing the release actuator body first end 202 through the collar 230 and threading the collar 230 into the lateral bore threaded portion 236.

In this configuration, a user may rotate the release actuator body 200 between two positions. In the first position, the cam wide diameter section 212 is rotated into the passage 30 and effectively engages the plunger assembly body 42. In this position, the force created by the engagement of the cam 210 and the plunger assembly body 42 create an opposing force that, effectively, biases the release actuator body 200 against the collar 230 and the lateral bore reduced diameter portion 220. This bias, along with the snug fit between various components, substantially resist the unintentional rotation of the release actuator body 200. Accordingly, the release actuator body 200 is structured to maintain the plunger assembly body 42 in either the first or second position as well as any position therebetween. The release actuator body 200 may be rotated to a second position wherein the cam narrow diameter section 216 is aligned with the passage 30 and the release actuator cam 210 does not effectively engage the plunger assembly body 42.

In operation, and assuming the plunger assembly body 42 and the release actuator body 200 are both in their respective first positions, a user may extend the plunger assembly body 42 by applying pressure to the release actuator body first end extension 203 and causing the actuator body 200 to move into its second position. Once the release actuator body 200 no longer effectively engages the plunger assembly body 42, the bias of the plunger assembly spring 41 moves the plunger assembly body 42 toward its second position. The user may then return the release actuator body 200 to the first position wherein the catch member 74, i.e., the cam 210, engages the plunger assembly body 42. To move the plunger assembly body 42 to an intermediate position, or to return the plunger assembly body 42 to the first position, the user moves the actuator body 200 into its second position and applies a force to the plunger assembly body top end 46 and in the direction of the socket 24 sufficient to overcome the bias of the plunger assembly spring 41 until the plunger assembly body 42 is in an intermediate position or the first position. Once the plunger assembly body 42 is in the desired position, the user again returns the release actuator body 200 to the first position wherein the catch member 74, i.e., the cam 210, engages the plunger assembly body 42.

Figure 8:
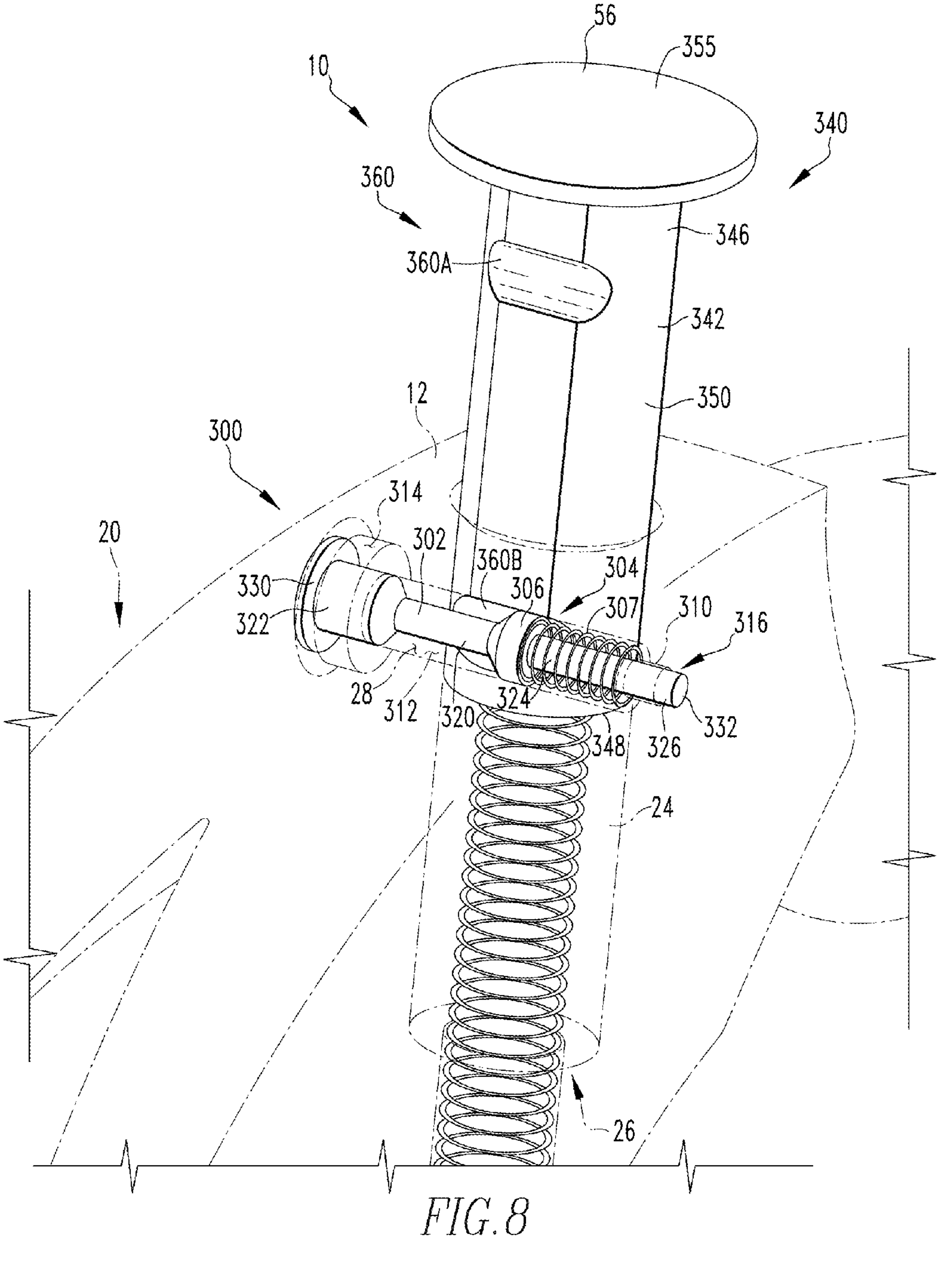
FIG. 8 is a detailed isometric view of another embodiment of the tool.

Another embodiment of the plunger assembly locking assembly 344 is shown in FIG. 8. It is understood that, unless otherwise noted, the tool head 12, handle, plunger assembly 40 and anti-rotation structure 35 may be the same as in the embodiment described above. In this embodiment the release actuator 300 is a pin 302 and the catch member 304 is a disk 306, or a lobe (not shown). That is, due to the ease of milling a pin 302 into the desired shape and because the pin 302 will typically be free to rotate within the lateral bore 28, a disk 306 is the preferred shape of the catch member 304. However, if the pin 302 is structured or configured to resist rotation, e.g. by having a spring fixed to the pin 302 and to the tool head 12, the catch member 304 may be a portion of a disk 306 such as a lobe.

In this embodiment, the lateral bore 28 again includes a reduced diameter portion 310 and a wide diameter portion

312. The lateral bore also includes a first open end 314 and a second open end 316; the lateral bore first open end 314 being in direct communication with the lateral bore wide diameter portion 312 and the lateral bore second open end 316 being in direct communication with the lateral bore reduced diameter portion 310. The lateral bore reduced diameter portion 310 may extend through the tool head 12 to the second open end 316. The lateral bore wide diameter portion 312 intersects with the socket 24. As set forth below, the pin 302 may have a first button 330 that has an increased diameter and therefore the bore first open end 314 may have a widest diameter portion 318 sized to accommodate the button 330.

The pin 302 has an elongated body 320 having a first end 322, a medial portion 324, and a second end 326. As in the first embodiment described above, the pin first end 322 is structured to extend from the lateral bore 28 and is further structured to act as a first button 330. The pin body 320 and second end 326 are, preferably, much thinner than the lateral bore wide diameter portion 312. The pin body second end 326 is sized to correspond to, but fit within and pass through, the second open end 316. The disk 306 is disposed on the pin medial portion 324. The disk 306 is sized to correspond to, but fit within, the lateral bore wide diameter portion 312.

The plunger assembly locking assembly 344 preferably includes a pin spring 307. The pin spring 307 is disposed between the disk 306 and the flange at the interface of the lateral bore wide diameter portion 312 and the lateral bore reduced diameter portion 310. The pin spring 307 is structured to bias the pin 302 to the first position as described below.

The plunger assembly 340 has a body 342 with a top end 346, a bottom end 348, and a medial portion 350. The plunger assembly body top end 346 may also include a cap 355 as described above. The plunger assembly body 342 also has at least one lateral groove 360, and preferably both a first and second lateral groove 360A, 360B. The plunger assembly body 342 may also have any number of intermediate lateral grooves (not shown). Each plunger assembly body lateral groove 360 corresponds to the shape of the portion of the lateral bore 28 that intersects with the socket 24. That is, when the plunger assembly body lateral groove 360 is aligned with the lateral bore 28, the plunger assembly body lateral groove 360 emulates that portion of the lateral bore 28 sidewall that is missing due to the presence of the socket 24. Preferably, the first groove 360A is positioned on the plunger assembly body 342 so that, when the plunger assembly body 342 is in the first, withdrawn position, the first groove 360A aligns with the lateral bore 28 and the second groove 360B is positioned on the plunger assembly body 342 so that, when the plunger assembly body 342 is in the second, extended position, the second groove 360B aligns with the lateral bore 28.

The hand tool 10 with this embodiment of the plunger assembly locking assembly 344 is assembled as follows. The plunger assembly body 342 is again disposed in the socket 24 and is structured to move between a first, withdrawn position and a second extended position as described above. The plunger assembly body 342 may be biased by a spring 41 as described above as well. When a plunger assembly body lateral groove 360 is aligned with the lateral bore 28, the pin 302 is inserted into the lateral bore 28. The pin second end 326 extends through the lateral bore second open end 316. It is noted that the pin second end 326 will typically include a stop device, such as, but not limited to, having the pin second end 326 flattened into a cap (not shown), structured to prevent the pin second end 326 from passing back into the lateral bore second open end 316. Further, if a pin spring 307 is used, the pin spring 307 is inserted into the lateral bore 28 prior to the pin 302.

In this configuration the disk 306 is initially disposed within the lateral bore wide diameter portion 312. It is noted that, in this position, the disk 306 extends into the plunger assembly body lateral groove 360 aligned with the lateral bore 28. As such, the plunger assembly body 342 is prevented from moving between the first, withdrawn position and the second extended position. It is noted that the anti-rotation device 35 prevents the plunger assembly body 342 from rotating so that the plunger assembly body lateral groove 360 does not align with the lateral bore 28.

The release actuator 300, that is, the pin 302, is structured to move between a first position, wherein the disk 306 extends into the plunger assembly body lateral groove 360, as described above, and a second position, wherein the pin 302 is moved laterally within the lateral bore 28 so that the disk 306 is disposed only within the lateral bore 28 and not within the plunger assembly body lateral groove 360. It is noted that, when the release actuator 300 is in the second position, the pin body second end 326 extends from the lateral bore second open end 316 and acts as a second button 332.

In this configuration, this embodiment of the plunger assembly locking assembly 344 is operated as follows. Assuming the plunger assembly body 342 is in the first, withdrawn position and the release actuator 300 is in the first position, the user presses on the first button 330 causing the release actuator 300 to move into the second position. Once the disk 306 no longer engages the plunger assembly body first groove 360A, the plunger assembly spring 41 causes the plunger assembly body 342 to move into the second, extended position. When the plunger assembly body 342 is in the second, extended position, the plunger assembly body second groove 360B is aligned with the lateral bore 28. The user then presses on the second button 332 and causes the release actuator 300 to return to the first position. With the release actuator 300 in the first position, the plunger assembly body 342 is held in the second, extended position. When the user no longer needs the plunger assembly body 342 in the second, extended position, the user again presses on the first button 330 causing the release actuator 300 to move in to the second position. Once the disk 306 no longer engages the plunger assembly body second groove 360B, the user may apply a sufficient force to overcome the bias of the plunger assembly spring 41 and move the plunger assembly body 342 into the first, withdrawn position. Once the plunger assembly body 342 is in the first, withdrawn position, the user then presses on the second button 332 and causes the release actuator 300 to return to the first position. Thus, the plunger assembly body 342 is once again held in the first, withdrawn position by the release actuator 300.

While specific embodiments of the invention have been described in detail, it will be appreciated by those skilled in the art that various modifications and alternatives to those details could be developed in light of the overall teachings of the disclosure. For example, in the first embodiment, the catch member 74 may be a pawl (not shown) and the detents 84 may be a toothed rack (not shown). Accordingly, the particular arrangements disclosed are meant to be illustrative only and not limiting as to the scope of invention which is to be given the full breadth of the claims appended and any and all equivalents thereof.

What is claimed is:

1. A hand tool comprising:

a tool head having a claw, said tool head defining a socket with a bottom;

an elongated handle coupled to said tool head;

said tool head having a plane of motion generally defined by a plane extending through the longitudinal axis of said handle and a centerline of said claw;

a plunger assembly having an elongated body with a top end, a bottom end and a locking assembly;

said plunger assembly body movably disposed in said socket, said plunger assembly body structured to move between a first, withdrawn position, wherein said plunger assembly body is substantially disposed within said socket, and a second, extended position, wherein said plunger assembly body extends from said socket;

said locking assembly includes a lateral bore in said tool head and a catch assembly with a release actuator;

said release actuator being disposed in said lateral bore; and said locking assembly structured to maintain said plunger assembly body in a selected position.

2. The hand tool of claim 1 wherein said release actuator being rotatable about an axis extending in a direction generally perpendicular to said tool head plane of motion.

3. The hand tool of claim 2 wherein:

said plunger catch assembly has a catch member;

said lateral bore having a common passage with said socket;

said catch member disposed within said bore and structured to selectively engage said plunger assembly body; and said release actuator substantially disposed in said lateral bore and structured to rotate within said bore between a first position, wherein said catch member is biased against said plunger assembly body, and a second position, wherein said catch member is not biased against said plunger assembly body.

4. The hand tool of claim 3 wherein:

said release actuator has an elongated body with a first end, a medial portion, and a second end;

said catch member being a cam on said release actuator body, said cam having a wide diameter section, a transition section, and a narrow diameter section; and said release actuator rotatably disposed in said bore and structured to move between a first orientation, wherein said cam wide diameter section extends through said passage and engages said plunger assembly body, and a second orientation, wherein said cam narrow diameter section is aligned with said passage and said release actuator cam does not effectively engage said plunger assembly body.

5. The hand tool of claim 4 wherein:

said bore includes a reduced diameter portion and a wide diameter portion;

said release actuator second end having a reduced diameter sized to fit snugly within said bore reduced diameter portion; and whereby, when said release actuator second end is disposed in said bore reduced diameter portion, said fit between said release actuator second end and said bore reduced diameter portion resists the rotation of said release actuator.

* * * * *